US012779970B2

(12) United States Patent
Landvik et al.

(10) Patent No.: US 12,779,970 B2
(45) Date of Patent: Nov. 3, 2026

(54) MODULAR SYSTEM FOR A VEHICLE, A VEHICLE AND AN INSTALLATION METHOD

(71) Applicant: Volvo Truck Corporation, Gothenburg (SE)

(72) Inventors: Sondre Landvik, Gothenburg (SE); Sigurd Sonderegger, Askim (SE)

(73) Assignee: Volvo Truck Corporation, Gothenburg (SE)

( * ) Notice: Subject to any disclaimer, the term of this patent is extended or adjusted under 35 U.S.C. 154(b) by 295 days.

(21) Appl. No.: 18/561,445

(22) PCT Filed: May 18, 2021

(86) PCT No.: PCT/EP2021/063119
§ 371 (c)(1),
(2) Date: Nov. 16, 2023

(87) PCT Pub. No.: WO2022/242829
PCT Pub. Date: Nov. 24, 2022

(65) Prior Publication Data
US 2024/0246403 A1 Jul. 25, 2024

(51) Int. Cl.
*B60K 1/04* (2019.01)
*B60L 50/64* (2019.01)
(Continued)

(52) U.S. Cl.
CPC ................ *B60K 1/04* (2013.01); *B60L 50/64* (2019.02); *H01M 50/209* (2021.01);
(Continued)

(58) Field of Classification Search
CPC .............. B60K 1/04; B60K 2001/0405; B60K 2001/0461; H01M 50/209; H01M 50/249;
(Continued)

(56) References Cited

U.S. PATENT DOCUMENTS 10,493,837 B1 12/2019 Angelo et al.
10,589,788 B1 3/2020 Milton et al.
(Continued)

FOREIGN PATENT DOCUMENTS

AT 521319 A1 12/2019
CA 3035952 A1 9/2020
(Continued)

OTHER PUBLICATIONS

International Search Report and Written Opinion of the International Searching Authority, PCT/EP2021/063119, mailed Dec. 10, 2021, 14 pages.
(Continued)

*Primary Examiner* — Tisha D Lewis
(74) *Attorney, Agent, or Firm* — Sage Patent Group

(57) ABSTRACT

A modular system for a vehicle. The modular system includes a plurality of energy source modules configured to be connected to or included in a propulsion system of a vehicle, each one of the energy source modules having a rectangular cross-section. The modular system also includes a support structure operatively connectable to a chassis of the vehicle, the support structure defining a space for receiving the energy source modules. At least one of the energy source modules is a pressurized vessel containing a gas. The invention also relates to a vehicle and to an installation method.

11 Claims, 6 Drawing Sheets

(51) Int. Cl.
*H01M 50/209* (2021.01)
*H01M 50/249* (2021.01)
*H01M 50/258* (2021.01)
*B60S 5/06* (2019.01)

(52) U.S. Cl.
CPC ....... *H01M 50/249* (2021.01); *H01M 50/258* (2021.01); *B60S 5/06* (2013.01); *H01M 2220/20* (2013.01)

(58) Field of Classification Search
CPC . H01M 50/258; H01M 2220/20; B60L 50/64; B60S 5/06
See application file for complete search history.

(56) References Cited

U.S. PATENT DOCUMENTS

| | | | |
|---|---|---|---|
| 2009/0166365 | A1 | 7/2009 | VanderGriend et al. |
| 2012/0068715 | A1 | 3/2012 | Martaeng |
| 2014/0117716 | A1 | 5/2014 | Patberg et al. |
| 2015/0291133 | A1 | 10/2015 | Hidalgo Balboa |
| 2019/0222054 | A1 | 7/2019 | Zettel et al. |
| 2020/0094669 | A1 | 3/2020 | DeLizo et al. |
| 2020/0331334 | A1 | 10/2020 | Sloan et al. |
| 2022/0161648 | A1* | 5/2022 | Ragot ...................... B60K 1/04 |
| 2024/0149654 | A1* | 5/2024 | Kvaldén ............... B60L 3/0007 |

FOREIGN PATENT DOCUMENTS

| | | | | |
|---|---|---|---|---|
| CN | 105438262 | A | 3/2016 | |
| DE | 19926607 | A1 | 12/2000 | |
| DE | 102008061757 | A1 | 6/2010 | |
| DE | 102014003323 | A1 | 9/2015 | |
| DE | 102014005290 | A1 | 10/2015 | |
| DE | 102017007490 | A1 | 2/2019 | |
| DE | 102019126592 | A1 * | 4/2021 | ............ B60K 15/07 |
| EP | 2581249 | A1 | 4/2013 | |
| EP | 3626497 | A2 | 3/2020 | |
| SE | 541564 | C2 | 11/2019 | |
| WO | 2019030070 | A1 | 2/2019 | |
| WO | 2020074105 | A1 | 4/2020 | |
| WO | WO-2021091448 | A1 * | 5/2021 | ............. B60L 50/66 |

OTHER PUBLICATIONS

Written Opinion of the International Preliminary Examining Authority, PCT/EP2021/063119, mailed May 8, 2023, 6 pages.
International Preliminary Report on Patentability of the International Preliminary Examining Authority, PCT/EP2021/063119, mailed Jul. 27, 2023, 7 pages.
Whiting, Allan H., "Supporting and Shifting Battery for Automobiles," U.S. Pat. No. 778,560 A, Dec. 27, 1904, 4 pages (unable to enter into US Patent Section due to age of patent).

* cited by examiner

MODULAR SYSTEM FOR A VEHICLE, A VEHICLE AND AN INSTALLATION METHOD

CROSS REFERENCE TO RELATED APPLICATIONS

This application is a 35 U.S.C. § 371 national stage application of PCT International Application No. PCT/EP2021/063119 filed on May 18, 2021, the disclosure and content of which is incorporated by reference herein in its entirety.

TECHNICAL FIELD

The present disclosure relates to a modular system for a vehicle. The present disclosure also relates to a vehicle comprising such a modular system. Furthermore, the present disclosure relates to a method of installing, to a vehicle, energy source modules for such a modular system.

The invention can be applied in heavy-duty vehicles, such as trucks, buses and construction equipment. Although the invention will be described with respect to a truck, the invention is not restricted to this particular vehicle, but may also be used in other vehicles such as cars or boats.

BACKGROUND

The vehicle industry is striving to reduce $CO_2$ emissions. Various alternatives to diesel and gasoline have been developed for energizing the vehicles. One such alternative is battery electric vehicles (BEV).

Electric vehicles are provided with electric motors which are powered by one or more traction batteries. To provide sufficient energy, i.e. driving range, a large number of battery cells are needed. The number of cells may be hundreds or even thousands of cells, for example depending on the total energy (driving range) desired for the particular vehicle. To safely and efficiently manage the large number of battery cells mounted in an electric vehicle, the battery cells are installed in units that protect the cells from external shocks, heat or vibration, etc. In their turn a number of such units can be united in a traction battery pack. In addition, a traction battery pack may also comprise cooling components and electric wiring, etc. Thus, when producing an electric vehicle, one or more traction battery packs will be installed into (or mounted onto) the vehicle.

On trucks, traction battery packs are normally suspended onto the chassis with multiple brackets and are connected to each other with a multitude of cables and connectors. The traction battery packs on trucks may be formed like cubes, suspended form a frame of the chassis.

An alternative to battery electric vehicles is the use of hydrogen gas. The chemical energy of the hydrogen may, for example, be converted into mechanical energy in an internal combustion engine or into electric energy in fuel cells, in order to propel the vehicle. The hydrogen gas is normally stored in cylindrical pressurized storage tanks/vessels provided on the vehicle. In fuel-cell electric vehicles (FCEVs) there is a need for storing energy in both batteries as well as in hydrogen gas tanks. Conventionally, the cylindrical hydrogen gas tanks have been mounted at a designated holding structure, normally laterally of the frame rails of the chassis.

For vehicles which are installed with gas tanks as well as with battery packs, i.e. a mixed model assembly on the manufacturing line in a factory, it would be desirable to reduce the diversity as regards installation components, tools and processes, in order to keep down investments costs, and to provide high flexibility and high production volumes.

SUMMARY

An object of the invention is to provide a modular system which at least partly accomplishes the above-mentioned advantages. This and other objects, which will become apparent in the following disclosure, are accomplished by a modular system according to claim 1.

The present general inventive concept is based on the realization that by providing gas tanks/vessels that have a rectangular cross-section, they may effectively be installed in a corresponding manner as other types of energy source modules (e.g. traction battery packs). With such a design of the gas tanks, they may be docked several at a time, even together with other energy source modules such as traction battery backs. Thus, by providing a modular system having a plurality of energy modules with a rectangular cross-section, of which at least one is a gas tank, it is possible to achieve a scalable installation process which utilizes the same principle regardless of the individual energy source modules being a gas tank or a battery pack. For instance, this allows for battery packs and gas tanks to be prepared on sub-flows in a similar manner with corresponding mechanical interface points. The docking process on the main assembly line in the factory may be done with the same equipment (e.g. the same automated guided vehicle) and tools regardless if you choose to install just batteries, just tanks or a combination thereof. On one sub-flow the battery packs may be prepared with high voltage cabling, low voltage cabling and cooling routing, while the gas tanks may be provided with valves and gas routing. The latter may be functional and pressure tested before being docked to the vehicle on the main assembly line. Furthermore, the rectangular design makes it possible to use the same support structure, including brackets and crash protection components, for the gas tanks and battery packs, which results in a lower part diversity and lower production cost. The modular design allows a wide variety of combinations to be installed, such as two battery packs and many gas tanks, or many battery packs and fewer gas tanks. The installation can be scaled depending on needs and available space at the installation part (e.g. wheelbase) of the vehicle.

It should be pointed out that in this disclosure the terms "tank" and vessel" are used interchangeably and mean effectively the same.

It should also be pointed out that although the main focus in this disclosure will be with respect to gas tanks/vessels containing hydrogen gas, the general inventive concept is not limited to that particular content. Energy source modules containing other types of gases may advantageously be used in exemplary embodiments of the general inventive concept.

Furthermore, it should also be pointed out that the same principle is valid for pressurized vessels containing liquid. For instance, the pressurized vessels may suitably contain hydrogen in liquid state. Thus, it should be understood that the general inventive concept encompasses pressurized vessels containing a fluid (i.e. gas or liquid).

It should be noted that the rectangular cross-section discussed herein encompasses the specific case of a rectangle having equal sized sides, i.e. a square cross-section, but also other rectangular shapes in which one of the pairs of opposing sides has different length compared to the other pair of opposing sides.

It should furthermore be noted that the internal design of the gas tanks/vessels do not form part of the present inventive concept. Rather, from a factory assembling perspective, it is the outer contour of the gas tanks/vessels that is of interest for the general inventive concept. For example, although the outer contour of a gas tank/vessel of the modular system is presented as a cuboid or as having a cuboid portion, the gas tank/vessel may for example be provided with an interior wall having a rounded shape.

According to at least a first aspect of the present disclosure, there is provided a modular system for a vehicle, comprising:

a plurality of energy source modules configured to be connected to or included in a propulsion system of a vehicle, each one of the energy source modules having a rectangular cross-section, and a support structure operatively connectable to a chassis of the vehicle, the support structure defining a space for receiving said energy source modules, characterized in that at least one of said energy source modules is a pressurized vessel containing a fluid.

By the provision of a modular system which comprises energy source modules having a rectangular cross-section, at least one of which being a pressurized vessel containing a fluid, manufacturing of a vehicle in a factory is facilitated, as the same support structure may be used also for the supporting the pressurized vessel.

According to at least one exemplary embodiment, at least one of said energy source modules is a traction battery pack. The traction battery pack may advantageously be installed to power an electric motor of the vehicle, and possibly other vehicle components as well.

According to at least some exemplary embodiments, at least one of said energy source modules may contain fuel cells. Such an energy source module may also advantageously power an electric motor. Such an energy source module may, for instance, receive to its fuel cells hydrogen gas from another one of the energy source modules (which is in the form of a pressurized vessel).

According to at least one exemplary embodiment, at least one of said energy source modules is cuboid. This is advantageous as it is a readily available shape for traction battery packs. Suitably, one or more of the other energy source modules, which are not necessarily traction battery packs, may also be cuboid. For instance, according to at least one exemplary embodiment, the at least one pressurized vessel is cuboid. It should be understood that the cuboid may be a general rectangular cuboid, which does not necessarily have the same surface areas on all six sides (e.g. one pair of opposite sides may have a different surface area compared to one or both of the other pairs of opposite sides). A cuboid may, of course, also be a square cuboid, having the same surface area on all sides.

Providing a plurality of energy source modules as cuboids is advantageous as they are easy to install, and the same equipment and tools may be used during the installation process, regardless of the content of the energy source modules, i.e. regardless of if one or more are in the form of traction battery packs, hydrogen tanks or any other type.

It should be noted that the energy source modules do not need to have the same dimensions. For example, different cuboid energy source modules may be of different sizes. This is at least partly reflected in the following exemplary embodiment.

According to at least one exemplary embodiment, a cross-sectional area of one of said energy source modules is approximately a multiple of any cross-sectional area of any other one of said energy source modules. Suitably, the cross-sectional areas may be the bottom areas of the energy source modules, i.e. the areas that will be facing downwards and that will rest against a base/floor or lower area of the support structure (or against any bushing provided at such a base/floor or lower area of the support structure). For instance, if the support structure can receive a total of four energy source modules having a smallest cross-sectional area, two of the smallest energy source modules may be replaced by one energy source module having twice as large cross-sectional area. Similarly, three of the smallest energy source modules may be replaced by an energy source module having a three times as large cross-sectional area. It may, for instance, be advantageous to provide a larger gas tank instead of two smaller ones.

As will be readily understood, the modularity of the present general inventive concept provides great flexibility for selecting which energy source modules that are to be installed on each individual vehicle. The possibility to have differently dimensioned energy source modules results in even greater flexibility.

It should be noted that although all the energy source modules have a rectangular cross-section, they may have other shapes than being a pure cuboid. In particular, it has been realized that although the main volume available is laterally of the frame rails of the chassis, it would also be beneficial to take advantage of the volume available underneath the frame rails. This is at least partly reflected in the following exemplary embodiment.

According to at least one exemplary embodiment, at least one of said at least one pressurized vessel has a first larger cuboid portion and a second smaller portion projecting from the first cuboid portion. When installed, the first larger cuboid portion may be located laterally of the longitudinal frame of the chassis, while the second smaller portion may project beneath the longitudinal frame. This is advantageous as a larger gas volume can be contained by also taking advantage of the available space underneath the frame, while still having the previously discussed installation advantages due to the rectangular cross-section of the cuboid portion.

It should be understood that in some exemplary embodiments of the modular system, this type of pressurized vessel having a second smaller projection portion may suitably be combined with other energy source modules. In other words, one and the same support structure may support one or more cuboid energy source modules at the same time as it supports one or more of this modified type (cuboid portion+projecting portion) of energy source modules.

From the above explanations, it can be understood that according to at least some exemplary embodiments of the modular system, the energy source modules may be prismatic.

According to at least one exemplary embodiment, the modular system further comprises bushings for mounting said energy source modules to the support structure in order to allow a certain amount of relative motion between the support structure and the energy source modules when mounted. This is advantageous as it avoids high stiffness to the chassis and restrains vehicle twisting. Furthermore, it reduces unnecessary stresses in the vessels and brackets.

Although in some exemplary embodiments the same bushings may be used for several or all types of energy source modules, in other exemplary embodiments it may be desirable to have different bushings, in particular with different stiffness. For instance, according to at least one exemplary embodiment, said bushings comprises first bushings having a first stiffness and second bushings having a second stiffness which is different from the first stiffness, wherein said first bushings are configured for mounting energy source modules in the form of pressurized vessels and wherein said second bushings are configured for mounting energy source modules in the form of traction battery packs. Typically, the traction battery packs may be heavier, wherefore it may be suitably to provide bushings with higher stiffness compared to the stiffness of the bushings used for the pressurized vessels. Thus, in such cases, in the above exemplary embodiment, the second stiffness would be greater than the first stiffness. However, it is also conceivable to have bushings with the same stiffness for traction battery packs and gas tanks, if it is considered to be appropriate in any individual case.

According to at least one exemplary embodiment, said support structure is in the form of an open cage structure provided with brackets for connecting the support structure to the chassis. The support structure may, for example, comprise a bottom portion, a lateral portion, a front portion, a rear portion and brackets for connecting the support structure to the chassis. The support structure may have partition portions for separating energy source modules in the longitudinal direction of the vehicle. The support structure may suitably be configured as a collision-protection structure, protecting the energy source modules in case of a collision.

According to at least one exemplary embodiment, the fluid contained in said pressurized vessel is selected from the group consisting of:

hydrogen, in gaseous state or liquid state
petroleum gas,
natural gas,
non-fuel gas, such as air.

Hydrogen (in liquid or gaseous state) may, for instance, be supplied to fuel cells which convert the chemical energy of hydrogen into electricity for powering an electric motor. Hydrogen may also or instead be used as a fuel for powering a hydrogen internal combustion engine. Similarly, petroleum gas or natural gas may also be used as fuel for internal combustion engines. The natural gas may, for example, be in the form of liquid natural gas (LNG). Compressed air may be provided to the intake manifold, the cylinders or to the turbocharger of an internal combustion engine to improve performance, such as transient response.

According to at least a second aspect of this disclosure, there is provided a vehicle comprising a modular system according to the first aspect (including any embodiments thereof), wherein the support structure is connected to a chassis of the vehicle, wherein energy source modules are provided in the support structure, wherein at least one of said energy source modules is a pressurized vessel containing a fluid. The advantages of the vehicle of the second aspect are largely analogous to the advantages of the first aspect.

It should be understood that depending on the type of vehicle, the support structure may be mounted in different locations. Thus, the support structure does not necessarily need to be mounted laterally of the chassis. For instance, the support structure may in some exemplary embodiments be mounted on top of the chassis behind a cab of the vehicle.

According to a third aspect of the present disclosure, there is provided a method of installing, to a vehicle chassis, energy source modules for a modular system according to the first aspect (including any embodiments thereof), the method comprising:

providing the vehicle chassis on a main assembly line, connecting a support structure to the vehicle chassis, the support structure defining a space for receiving said energy source modules, providing, on a first sub-assembly line, a first type of said energy source modules with connecting components for enabling said first type of energy source modules to be connected to or included in a propulsion system of a vehicle which includes said vehicle chassis, providing, on a second sub-assembly line, a second type of said energy source modules with connecting components for enabling said second type of energy source modules to be connected to or included in said propulsion system of said vehicle, said second type being a pressurized vessel containing a fluid, selecting a number of energy source modules of the first type and a number of energy source modules of the second type, and mounting them to the support structure on the main assembly line.

By preparing different energy source modules on different sub-assembly lines, they can be provided in a ready-to-install-state at the main assembly line. Therefore, the installation onto the vehicle will be simple and efficient, regardless of which one of the types of electric source modules that is/are to be installed to the vehicle.

The advantages of the third aspect of the present disclosure largely corresponds to the advantages of the modular system of the first aspect, including any embodiment thereof.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
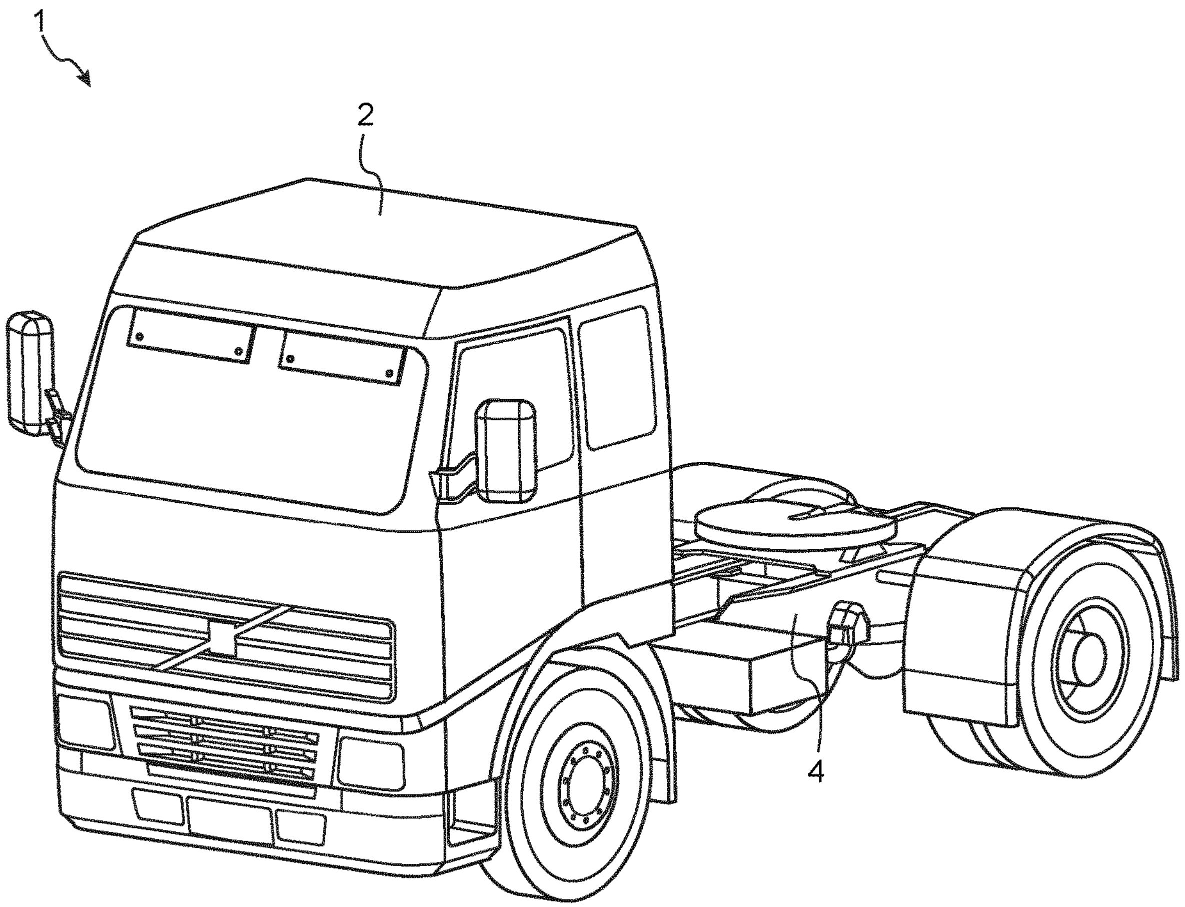
FIG. 1 illustrates a vehicle for which at least some exemplary embodiments of the invention may be implemented.

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art.

Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

FIG. 1 illustrates a vehicle for which at least some exemplary embodiments of the invention may be implemented. Although the vehicle 1 is illustrated in the form of a truck, other types of vehicles, such as busses, construction equipment, trailers, passenger cars or even boats may be provided in accordance with the invention. The truck (vehicle 1) comprises a cab 2 in which a driver may operate the vehicle 1. The vehicle 1 comprises a frame structure, i.e. a chassis 4 to which a modular system according to embodiments of the present invention may be connected (not shown in FIG. 1). The modular system may, for example, be installed behind the cab 2. In other exemplary embodiments, the modular system, and in particular the support structure of the modular system, may be installed laterally of frame rails of the chassis 4.

Figure 2:
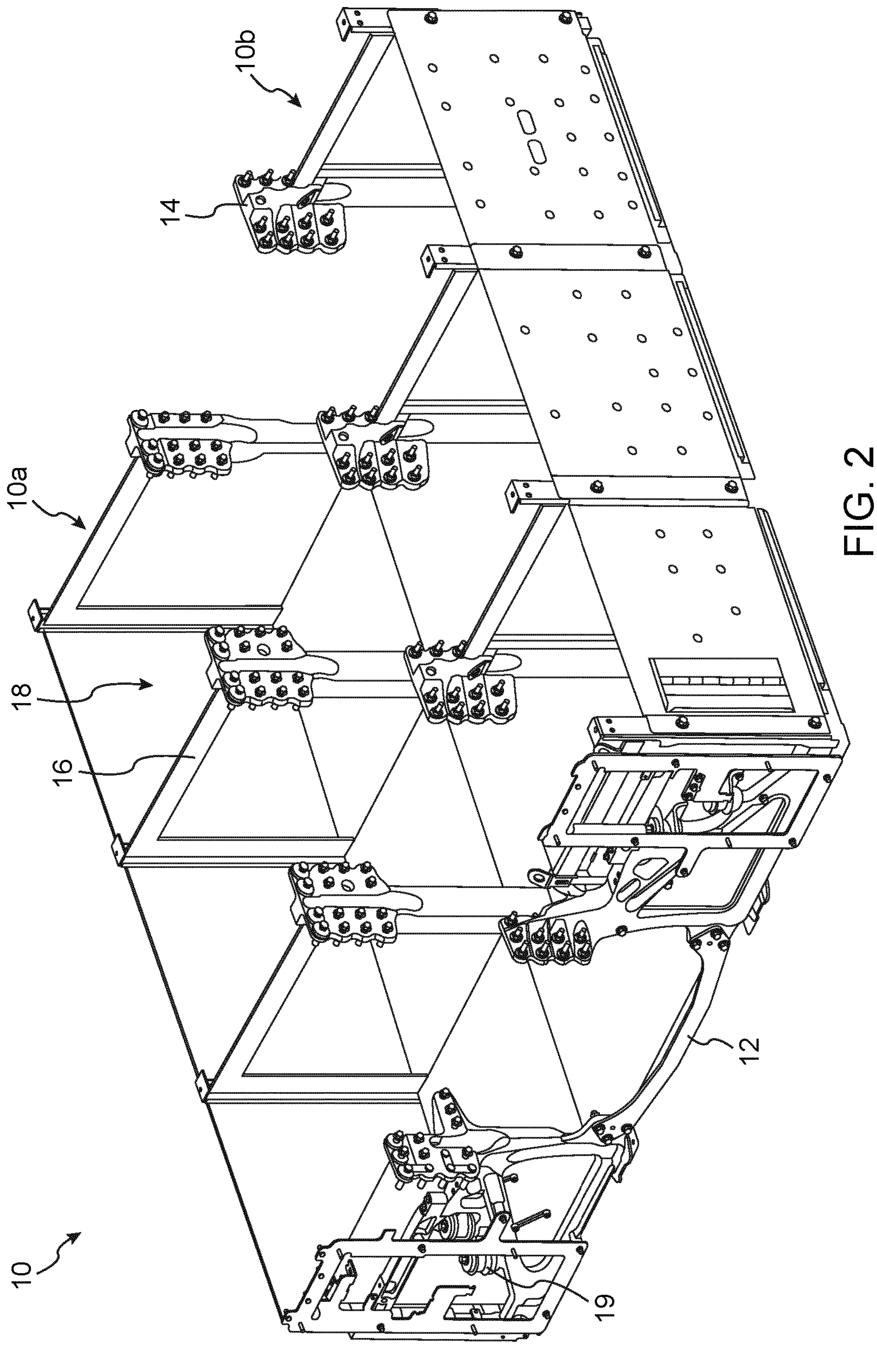
FIG. 2 illustrates a support structure of a modular system in accordance with at least one exemplary embodiment of the invention.

FIG. 2 illustrates schematically a support structure 10 of a modular system in accordance with at least one exemplary embodiment of the invention. The support structure 10 is herein illustrated as an open cage structure for receiving energy source modules. In the illustrated exemplary embodiment, the support structure 10 is a two-sided support structure, having a first part 10*a* configured to be located on the left side of a vehicle chassis and a second part 10*b* configured to be located on the right side of the chassis. The first part 10*a* and the second part 10*b* are interconnected by connecting elements 12 (only one shown in FIG. 2), which may extend underneath the chassis. Although the connecting elements 12 are configured to extend underneath the chassis, the first and the second parts 10*a*, 10*b* will be located generally laterally of the chassis, i.e. on respective sides thereof. It should be understood that in other exemplary embodiments, the support structure 10 may have only one part, and does not necessarily need to be connected laterally of the chassis, as other locations may be more appropriate depending on the configuration of the individual vehicle to which a support structure 10 is to be installed. In the illustrated exemplary embodiments, the support structure 10 is provide with brackets 14 for attaching the support structure 10 to the chassis. Suitable fastening elements, such as bolts, may be driven through the brackets 14 and the chassis to tighten the support structure 10 to the chassis. As illustrated in FIG. 2, the support structure 10 may be provided with partition portions 16 for dividing the available space into individual compartments 18. This reduces the risk of the energy source modules inadvertently bumping into each other during driving. In the present illustration, there are three compartments 18 on either side, which means that the support structure 10 is prepared for receiving six energy source modules. Although the compartments 18 have been illustrated as having substantially the same dimensions, many variations are conceivable. For instance, by removing one partition portion 16, you create a compartment which is approximately double the size of the other compartments 18, which can thus receive an energy source module being twice as large as the others. In other exemplary embodiments, the location of the partition portions may be selectable, such that different sizes of individual compartments may be provided. The flexibility of choosing different sizes of energy source modules is, in particular, advantageous for energy source modules in the form of pressurized vessels containing gas or liquid, as depending on the requirement of the volume of the fluid to be installed, it may be more practical and economical (and better utilization of available space) to install a large vessel compared to several small ones.

The modular system may suitably comprise bushings 19 for mounting the energy source modules to the support structure in order to allow a certain amount of relative motion between the support structure source and the energy source modules when mounted. The bushings may comprise first bushings having a first stiffness and second bushings having a second stiffness which is different from the first stiffness, wherein said first bushings are configured for mounting energy source modules in the form of pressurized vessels and wherein said second bushings are configured for mounting energy source modules in the form of traction battery packs.

Figure 3:
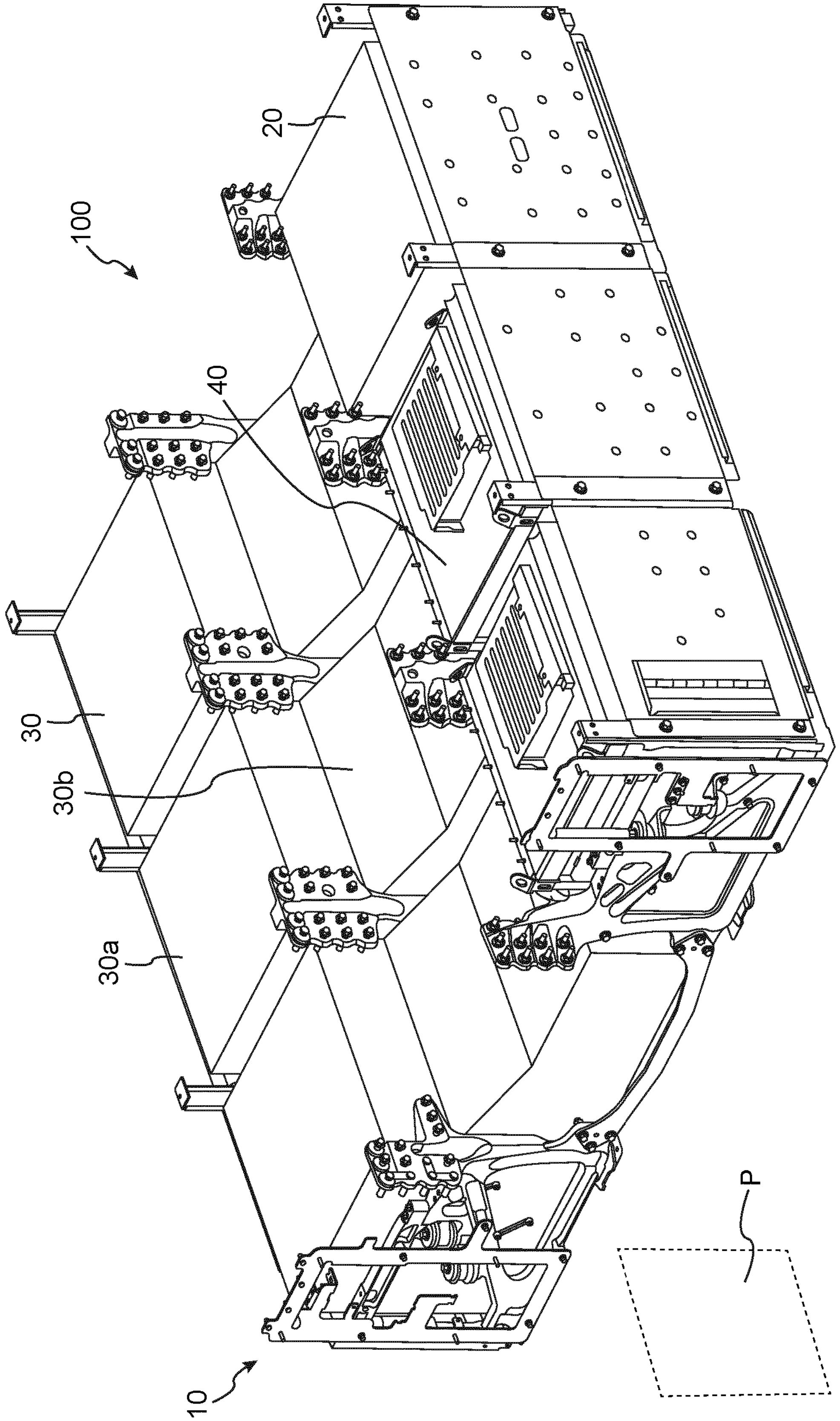
FIG. 3 illustrates a modular system in accordance with at least one exemplary embodiment of the invention.

FIG. 3 illustrates a modular system 100 in accordance with at least one exemplary embodiment of the invention. In this exemplary embodiment the modular system 100 comprises the support structure 10 illustrated in FIG. 2, however, as may be readily understood, in other exemplary embodiments the modular system 100 may have a different support structure. The modular system 100 also comprises a plurality of energy source modules 20, 30, 40 configured to be connected to or included in a propulsion system of the vehicle to which the support structure 10 is mounted. Each one of the energy source modules 20, 30, 40 has a rectangular cross-section. In particular, it should be noted that at least one of said energy source modules 20, 30 is a pressurized vessel containing a fluid, such as a gas or a liquid. This is in contrast to traditional configurations of pressurized vessels, which traditionally have been provided in the form of circular cylindrical containers. Such pressurized vessels require specific handling, equipment and tools when mounting them to a vehicle in a factory. By instead providing the pressurized vessels 20, 30 with rectangular cross-section, the installation and mounting is greatly facilitated as the same equipment and tools may be used as for other energy source modules 40, such as traction battery packs, that also have rectangular cross section. It should be noted that the interior of the pressurized vessel may include rounded interior walls, as long as the outer configuration has a rectangular cross-section, since the outer configuration (not the inner configuration) is the facilitating factor in the installation process at a factory.

In the illustrated exemplary embodiment, there are shown six energy source modules 20, 30, 40, two of which are in the form of traction battery packs 40, and the remaining four are in the form of pressurized vessels 20, 30 containing a fluid, such as hydrogen in gaseous or liquid state. As illustrated in FIG. 3, the energy source modules may come in different sizes and different formfactors, but they all have a rectangular cross-section.

According to at least some exemplary embodiments of the present disclosure, each energy source module 20, 30, 40 has a rectangular cross-section in a geometrical plane P which is perpendicular to the pitch axis of the vehicle, i.e. a plane which extends in the vertical and longitudinal direction of the vehicle. The energy source modules 20, 30, 40 will normally be provided with different connecting elements, routings, etc. which means that they will have a designated orientation in which they should be mounted to the support structure and thus relative to the vehicle as well. Therefore, according to at least some exemplary embodiments, each energy source module 20, 30, 40 has a designated inboard side configured to face towards the centre of the vehicle when installed, a designated outboard side configured to face away from the centre of the vehicle. Thus, according to at least some exemplary embodiments, each energy source module 20, 30, 40 has a rectangular cross-section in a geometrical plane P which is parallel to the inboard and or outboard side of the energy source module. It should be noted that energy source modules 20, 30, 40 may have a rectangular cross-section in other planes and directions as well. For instance, in FIG. 3 each one of the two traction battery packs 40 has a substantially cuboid shape, and thus has rectangular cross-section in three orthogonal directions/planes. It should also be noted that several energy source modules may be interconnected such that one of the interconnected energy source module provides a common connection to the propulsion system. For instance, several pressurized vessels may be interconnected by suitable piping, and only one of them has a connection for providing the fluid to the propulsion system.

As illustrated in FIG. 3, a first type of the pressurized vessels 20 is, similarly to the traction battery packs 40, substantially cuboid. The other three pressurized vessels 30 represent a second type and are here illustrated as having a different formfactor. These other three traction battery packs are illustrated as including the basic shape of the cuboid of the first type, but has an additional shape in the form of a smaller projection. Thus, each one of the illustrated second type of pressurized vessels has a first larger cuboid portion 30*a* and a second smaller portion 30*b* projecting from the first cuboid portion 30*a*. The second portion 30*b* is configured to fit underneath the frame rails of the chassis, while the cuboid portion 30*a* is configured to be located laterally of the chassis. In this way, the smaller projecting portions 30*b* add extra available fluid volume that can be stored. For example, the cuboid first type of pressurized vessel 20 may contain 270 litres of fluid, while each one of the larger second type pressurized vessels 30 may contain 420 litres. Other volumes are of course conceivable as well.

It may be noted that in the illustrated exemplary embodiments, the smaller projecting portions 30*b* also have a rectangular cross-section, at least in geometrical planes P perpendicular to the pitch axis.

It should be emphasized that FIG. 3 is merely an illustrative exemplary embodiment to give an idea of different possibilities within the scope of the present invention. It should, however, be understood that there are numerous variations possible, and the specific choice of which kinds, configurations and sizes of energy source modules that are chosen to be used for a particular vehicle may depend on the individual configuration of the vehicle, the requests of the customer, etc.

For instance, in some exemplary embodiments only cuboid pressurized vessels 20 are used. In some exemplary embodiments, only the second type of pressurized vessels 30 are used. The number of the different types of the energy source modules may also be chosen according to needs. Thus, the number of traction battery packs 40 may be more than two or may be just one.

Figure 4A:
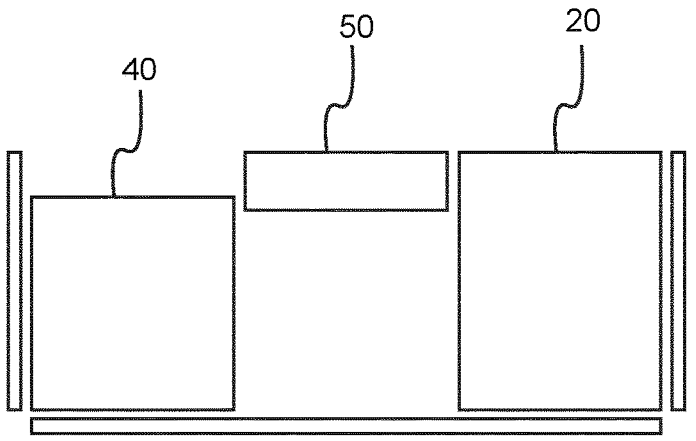
FIGS. 4*a*-4*c* schematically illustrate some different configurations that are possible to install in accordance with at least some exemplary embodiments of the invention.
Figure 4B:
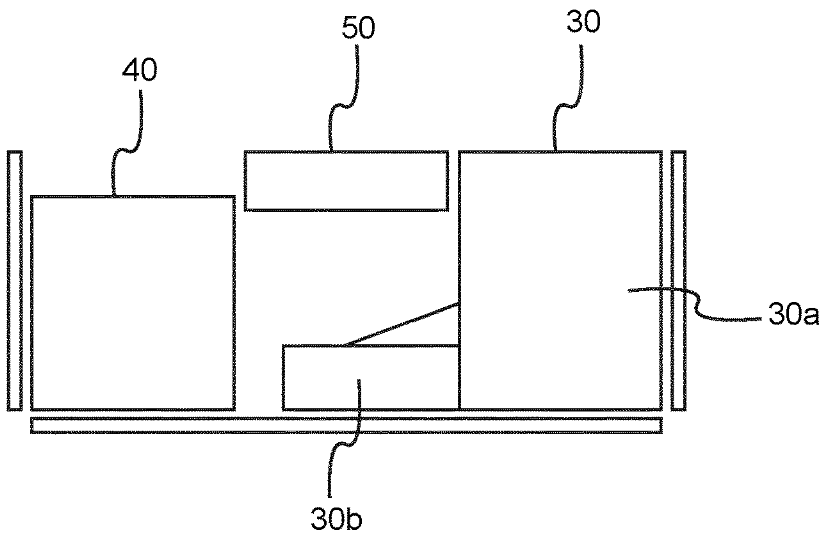
Figure 4C:
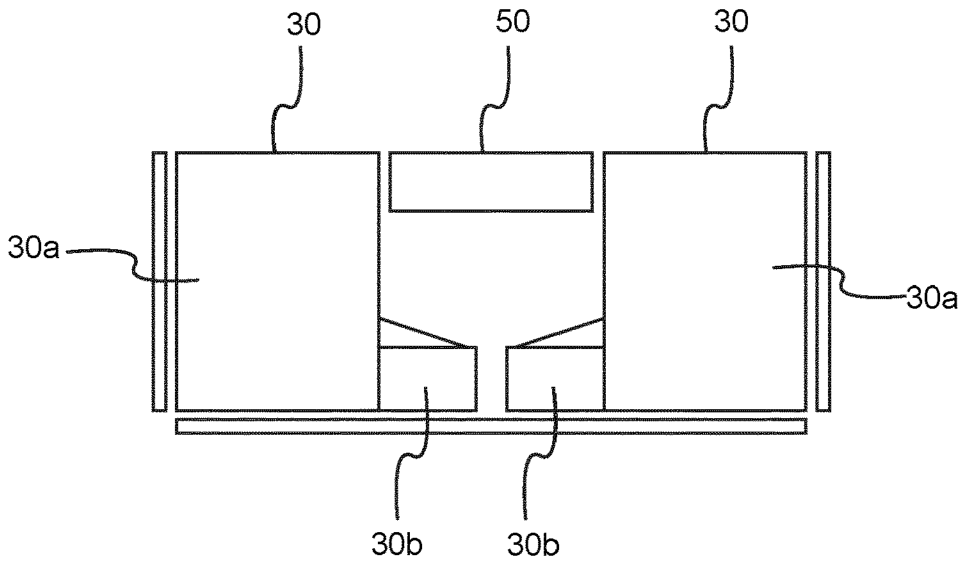

FIGS. 4*a*-4*c* schematically illustrate some different configurations that are possible to install in accordance with at least some exemplary embodiments of the invention. The schematic illustrations represent a vertical cross-section taken perpendicular to the longitudinal direction of the vehicle. In each one of FIGS. 4*a*-4*c* there is schematically illustrated a central chassis frame 50. In each one of FIGS. 4*a*-4*c* there is illustrated an energy source module located on the left hand side of the frame 50 and an energy source module located on the right side of the frame. These figures show examples of different formfactors and setups between the left hand side and the right hand side.

FIG. 4*a* illustrates a traction battery pack 40 on the left hand side of the frame 50 and a gas-containing (or liquid-containing) pressurized vessel 20 on the right hand side of the frame. In this illustration, the traction battery pack 40 may have substantially equally dimensioned sides, while the pressurized vessel 20 may have a pair of opposite sides with different dimensions than the other pairs of opposite sides. However, in other exemplary embodiments, the pressurized vessel 20 may have all sides of equal dimensions, and in some exemplary embodiments the traction battery pack 40 may have a differentiating pair of opposite sides. Thus, the present general inventive concept is not limited to a specific size or overall shape of certain energy source modules. For instance, a traction battery pack 40 and a pressurized vessel 20 may, in at least some exemplary embodiments, share the same formfactor and dimensions.

In the example illustrated in FIG. 4*b* the pressurized vessel on the right hand side in FIG. 4*a* has been replaced by a differently shaped gas-containing pressure vessel 30. In FIG. 4*b*, a first large portion 30*a* of the pressurized vessel has the same formfactor as the entire pressurized vessel 20 of FIG. 4*a*, i.e. cuboid. However, in addition to the cuboid first large portion 30*a*, there is also provided a second smaller projecting portion 30*b*, which projects inboardly and underneath the frame 50.

FIG. 4*c* illustrates a further alternative in which both the left hand side and the right hand side is provided with pressurized vessels 30 having a first large portion 30*a*, which is cuboid, and a smaller projecting second portion 30*b*. Since the second smaller projecting portions 30*b* project from both the left hand side and the right hand side, they will normally present shorter projections than when projecting only from one side (compare with FIG. 4*b*).

As understood from the drawings presented herein, according to at least one exemplary embodiment, the second smaller portion projects 30*b* from a lower region of the first larger cuboid portion 30*a*.

Figure 5A:
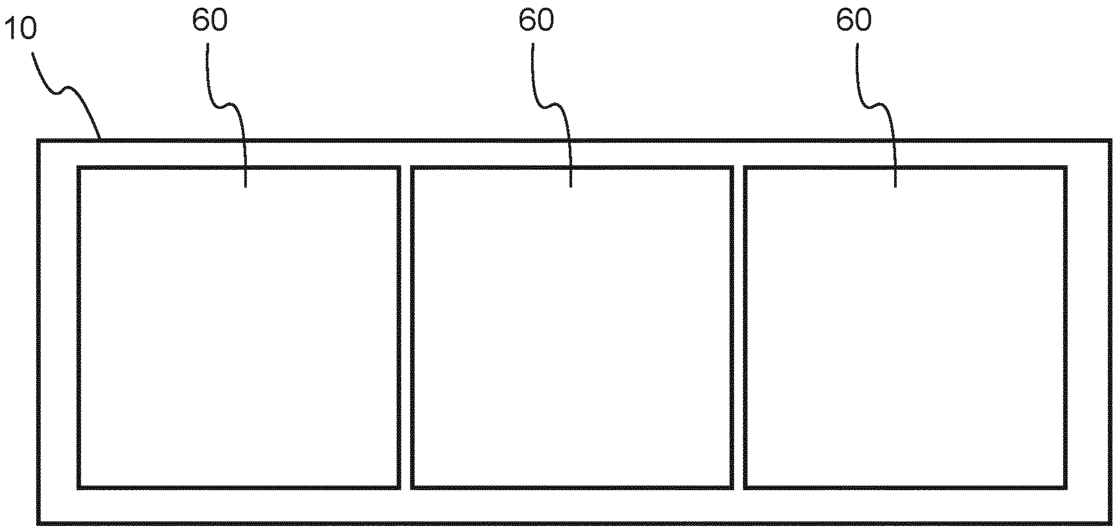
FIGS. 5*a*-5*b* schematically illustrate that a support structure is able to receive energy source modules of different dimensions, in accordance with at least some exemplary embodiments of the invention.
Figure 5B:
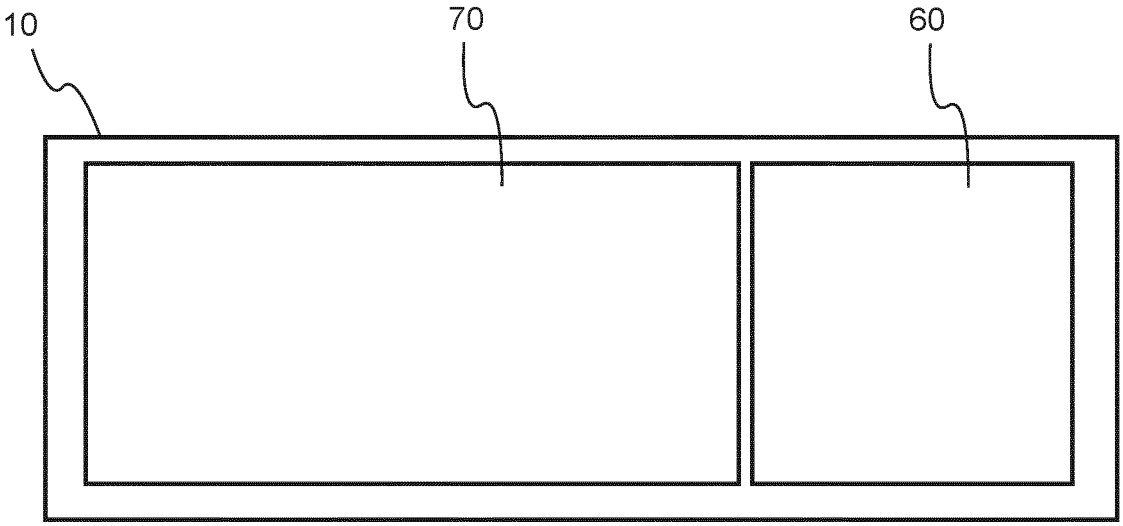

FIGS. 5*a*-5*b* schematically illustrate that a support structure 10 is able to receive energy source modules of different dimensions, in accordance with at least some exemplary embodiments of the invention. FIG. 5*a* illustrates a support structure 10 which has received three energy storage modules 60 of equal size. FIG. 5*b*, however, illustrates that a corresponding support structure 10 has only received two energy storage modules 60, 70, one of which is approximately twice the size of the other one. Thus, according to at least one exemplary embodiment, the cross-sectional area of one of said energy source modules 70 is approximately a multiple of any cross-sectional area of any other one of said energy source modules 60. It should however, be understood that in other exemplary embodiments the size difference does not necessarily need to be a multiple of another, but other dimensions are also conceivable. For instance, in the illustrated example, if the larger one of the energy source modules 70 in FIG. 5*b* is reduced slightly in size, the support structure may be used for receiving other items than just energy source modules.

The various different illustrated pressurized vessels of the drawings may suitably contain a fluid selected from the group consisting of hydrogen, petroleum gas, natural gas and air, as already discussed elsewhere in this disclosure.

Figure 6:
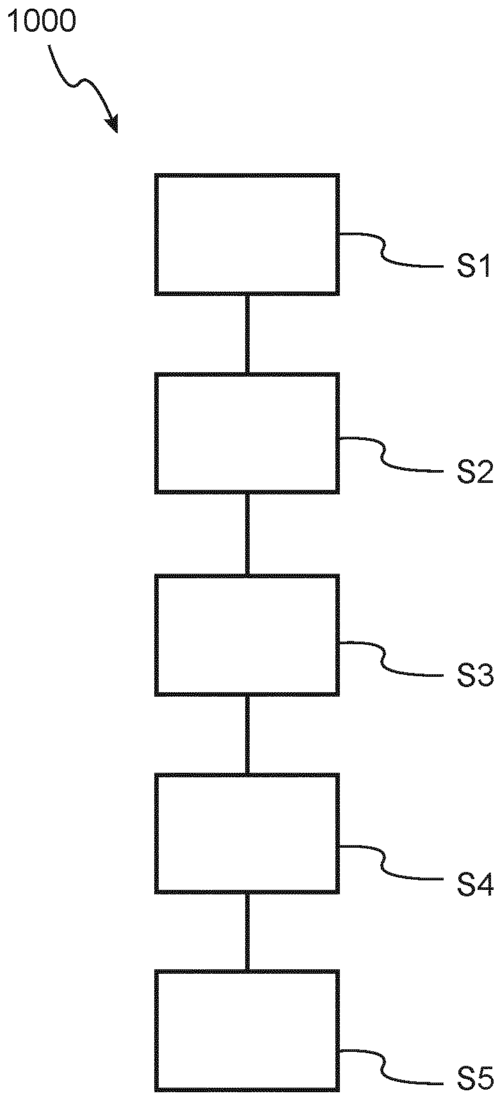
FIG. 6 schematically illustrates a method according to at least one exemplary embodiment of the invention.

FIG. 6 schematically illustrates a method 1000 according to at least one exemplary embodiment of the invention. More specifically, there is illustrated a method 1000 of installing, to a vehicle chassis, energy source modules for a modular system disclosed herein. The method 1000 comprises:

- in a step S1, providing the vehicle chassis on a main assembly line,
- in a step S2, connecting a support structure to the vehicle chassis, the support structure defining a space for receiving said energy source modules,
- in a step S3, providing, on a first sub-assembly line, a first type of said energy source modules with connecting components for enabling said first type of energy source modules to be connected to or included in the propulsion system of the vehicle,
- in a step S4, providing, on a second sub-assembly line, a second type of said energy source modules with connecting components for enabling said second type of energy source modules to be connected to or included in the propulsion system of the vehicle, said second type being a pressurized vessel containing a gas,
- in a step S5, selecting a number of energy source modules of the first type and a number of energy source modules of the second type, and mounting them to the support structure on the main assembly line.

It should be noted that the steps do not necessarily have to be carried out in the listed order. For instance, steps S3 and S4 may be performed simultaneously. Indeed steps S3 and S4 may suitably be performed simultaneously with steps S1 and S2.

It is to be understood that the present invention is not limited to the embodiments described above and illustrated in the drawings; rather, the skilled person will recognize that many changes and modifications may be made within the scope of the appended claims.

The invention claimed is:

1. A modular system for a vehicle, comprising:

- a plurality of energy source modules configured to be connected to or included in a propulsion system of a vehicle, each one of the energy source modules having a rectangular cross-section, and
- a support structure operatively connectable to a chassis of the vehicle, the support structure defining a space for receiving said energy source modules,
- wherein at least one of said energy source modules is a pressurized vessel containing a fluid, and the pressurized vessel has a first larger cuboid portion and a second smaller portion projecting inboardly from the first cuboid portion and underneath a chassis frame of the vehicle.

2. The modular system according to claim 1, wherein at least one of said energy source modules is a traction battery pack.

3. The modular system according to claim 1, wherein at least one of said energy source modules is cuboid.

4. The modular system according to claim 3, wherein the at least one pressurized vessel is cuboid.

5. The modular system according to claim 1, wherein a cross-sectional area of one of said energy source modules is approximately a multiple of any cross-sectional area of any other one of said energy source modules.

6. The modular system according to claim 1, further comprising bushings for mounting said energy source modules to the support structure in order to allow a certain amount of relative motion between the support structure and the energy source modules when mounted.

7. The modular system according to claim 6, wherein said bushings comprises first bushings having a first stiffness and second bushings having a second stiffness which is different from the first stiffness, wherein said first bushings are configured for mounting energy source modules in the form of pressurized vessels and wherein said second bushings are configured for mounting energy source modules in the form of traction battery packs.

8. The modular system according to claim 1, wherein said support structure is in the form of an open cage structure provided with brackets for connecting the support structure to the chassis.

9. The modular system according to claim 1, wherein the fluid contained in said pressurized vessel is selected from the group consisting of:

- hydrogen, in gaseous state or liquid state,
- petroleum gas,
- natural gas, and
- non-fuel gas.

10. A vehicle comprising a modular system, wherein the modular system comprises:

- a plurality of energy source modules configured to be connected to or included in a propulsion system of a vehicle, each one of the energy source modules having a rectangular cross-section, and
- a support structure operatively connectable to a chassis of the vehicle, the support structure defining a space for receiving said energy source modules,
- wherein at least one of said energy source modules is a pressurized vessel containing a fluid, and the pressurized vessel has a first larger cuboid portion and a second smaller portion projecting inboardly from the first cuboid portion and underneath a chassis frame of the vehicle.

11. A method of installing, to a vehicle chassis, energy source modules for a modular system according to claim 1, comprising:

- providing the vehicle chassis on a main assembly line,
- connecting a support structure to the vehicle chassis, the support structure defining a space for receiving said energy source modules,
- providing, on a first sub-assembly line, a first energy source module of said energy source modules with connecting components for enabling said first energy source module of the energy source modules to be connected to or included in a propulsion system of a vehicle which includes said vehicle chassis,
- providing, on a second sub-assembly line, a second energy source module of said energy source modules with connecting components for enabling said second energy source module of the energy source modules to be connected to or included in said propulsion system of said vehicle, said second energy source module being a pressurized vessel containing a fluid, selecting a number of energy source modules of the first energy source module and a number of energy source modules of the second energy source module, and mounting them to the support structure on the main assembly line.

* * * * *